United States Patent [19]

Appling

[11] Patent Number: 4,628,851
[45] Date of Patent: Dec. 16, 1986

[54] VIBRATION ISOLATION MODULE
[75] Inventor: James Appling, Canoga Park, Calif.
[73] Assignee: Allied Corporation, Morristown, N.J.
[21] Appl. No.: 685,949
[22] Filed: Dec. 24, 1984
[51] Int. Cl.$^4$ ............................................. B63B 21/04
[52] U.S. Cl. ................................. 114/253; 174/101.5;
367/104
[58] Field of Search ............... 114/253, 243, 244, 230,
114/213; 367/20, 154; 174/42, 101.5; 403/267

[56] References Cited
U.S. PATENT DOCUMENTS
4,090,168  5/1978  Miller et al. ...................... 174/101.5
FOREIGN PATENT DOCUMENTS
83/00564  2/1983  PCT Int'l Appl. .................. 367/154

Primary Examiner—Trygve M. Blix
Assistant Examiner—Jesûs D. Sotelo
Attorney, Agent, or Firm—Robert C. Smith; William F. Thornton

[57] ABSTRACT

A vibration isolation module (30) includes termination members (34, 36) at each end to which are connected electrical wires or cable (39), and a braided rope of aramid fiber (32). A plurality of compliant members (40) of polyurethane hose having tapered ends are inserted at intervals within the braided strands of the rope (32). Some of the compliant members (40) may be filled solid with polyurethane. Variable lengths of hose or variable diameters and wall thicknesses may be used to vary the compliance of the compliant members (40). Between the compliant members (40) are positioned a number of spacer members (38) which provide support for the hose (37) and electrical wires (39). This structure is carried within an oil filled stretchable hose (37) fastened to the termination members. When the module (30) is subjected to forces in tension, the load is carried by the aramid fiber rope (32) which, as the load is increased, tends to squeeze down and compress the compliant members (40).

10 Claims, 3 Drawing Figures

VIBRATION ISOLATION MODULE

This invention relates to a vibration isolation module.

A vibration isolation module as disclosed herein is connected between an elongated sonar array containing a plurality of hydrophones and a towing vessel. Such modules are used to attenuate tow cable strum, engine and propeller noise and other cable borne noise which would tend to cause interference with received signals. A vibration isolation module requires a stretchable or resilient internal strength member for carrying tensile loads, a pair of termination members for carrying electrical connectors and for connecting the module to the array and to the towing vessel, wiring carrying electrical power and signals between the array and the towing vessel and a stretchable exterior jacket which may be a polyurethane hose bonded to the termination members and which carries a non-corrosive liquid such as oil. A plurality of such modules may be connected in series between said array and the towing vessel.

A current configuration of vibration isolation module includes a center strength member of aramid fiber rope which is attached at each end to a termination member and to a plurality of spacer members. Also attached to the spacer members are a plurality of nylon ropes which will stretch and which are attached in such manner as to leave a significant amount of slack in the aramid fiber rope which stretches very little. The necessary electrical wires are also attached to the termination members and fed through the spacers, leaving enough slack so that they are not put in tension. While this configuration provides a fairly satisfactory vibration isolation module, it is difficult and expensive to build and calibrate, at least partly because of the number of nylon ropes whose tension must be balanced. Also, the nylon ropes, although somewhat elastic, have a rather definite limit as to how much they will stretch and the entire module in effect "bottoms out" when the nylon ropes stretch to the point of putting a substantial load on the aramid fiber rope. Therefore, the elasticity of the total module is limited by the amount that the nylon ropes can be stretched without reaching permanent deformation. This limit in elasticity also limits the frequency range over which the module may be effective.

The vibration isolation module of the present invention is characterized in that, in addition to carrying a cable with electrical conductors, it utilizes a single braided strength member of aramid fiber rope or the like and a plurality of damping elements formed of various lengths of polyester polyurethane tubing carried within the strands of said strength member, each of said damping elements being tapered at each end and with each end of said strength member being attached to a termination member, and molded polyurethane spacers spaced along the length of said strength member and attached between said damping elements.

According to another feature of the invention, the spacing of the spacers and the lengths of at least some of the damping elements are of varying dimensions such that damping elements of each length tend to attenuate a specific vibration frequency range.

Still another feature of the invention includes damping elements filled with polyurethane which provide attenuation over a specific frequency range different from the range affected by the unfilled damping elements.

These and other features and advantages will become apparent from consideration of the accompanying drawings wherein.

Figure 1:
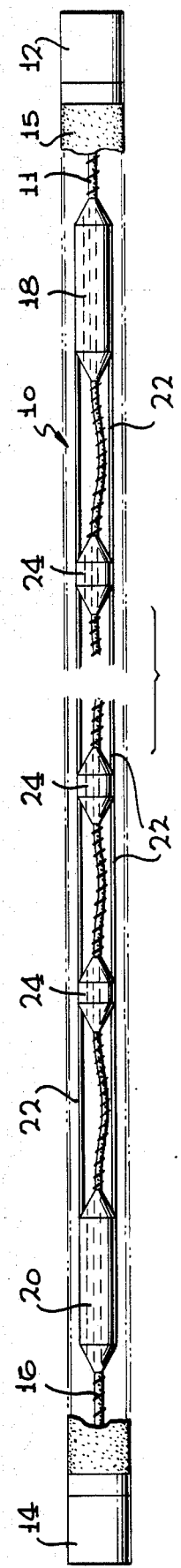
FIG. 1 is a plan view, partly in section, of a prior art vibration isolation module.

Referring now to FIG. 1, a prior art vibration isolation module 10, referred to below as VIM includes an aramid fiber rope 11 fastened to a pair of hose termination members 12 and 14 which also serve as electrical connectors to which a multi-wire electrical cable 16 is connected. A truncated section of an external polyurethane hose 15 is shown attached to terminations 12 and 14, which hose is stretchable and contains oil (a low density hydrocarbon fluid) which resists the compressive force of the surrounding sea water. Spaced along and bonded to rope 11 a short distance from the termination members 12 and 14 are a pair of spacer members 18 and 20, respectively, to each of which are bonded a plurality of nylon ropes 22, of essentially equal length. Ropes 22 are also bonded to each of a plurality of spacer members 24 which are spaced at varying distances along the VIM 10. Each of the spacer members 24 includes a channel or groove for supporting and directing cable 16 and the aramid fiber rope 11. Each of cable 16 and rope 11 are made sufficiently long that they have a significant amount of slack when the VIM 10 is unloaded or lightly loaded. It is intended that cable 16 be of such length that it never receives a load in tension. As a load is placed on the VIM 10 tending to separate termination members 12 and 14, this load is taken by the short length of aramid fiber rope 11 between hose termination member 12 and rope termination 18 and between hose termination 14 and rope termination 20 so that rope terminations 18 and 20 move with members 12 and 14, respectively. As rope terminations 18 and 20 are pulled apart, the nylon ropes 22 simultaneously pick up the load and begin to stretch. At some point the nylon ropes approach a designed load limit (substantially less than would cause them to break) and the aramid fiber rope 11, which has great tensile strength, is stretched taut. Since aramid fiber stretches very little, the aramid fiber rope 11 will then begin to pick up any additional load and the VIM 10 essentially "bottoms out" and it no longer serves to attenuate noise. Such a condition does not occur in ordinary operation, but only in the case of an unusual load such as where it becomes necessary to tow the array at greater speed than usual. In operation at normal towing speeds, the load is carried on the nylon ropes and the different sections of the VIM 10 between spacers will tend to attenuate different frequency bands. As indicated, the structure described is typical of the prior art and incorporates the above described disadvantages that more parts are needed, calibration is difficult and time consuming because of the need to balance the loading of the nylon ropes and determining the desired spacing of the spacers is difficult, all of which adversely affect costs. In addition, since the nylon ropes stretch only a limited, finite amount without suffering permanent deformation this serves to limit the frequency range of noise over which VIM is effective.

Figure 2:
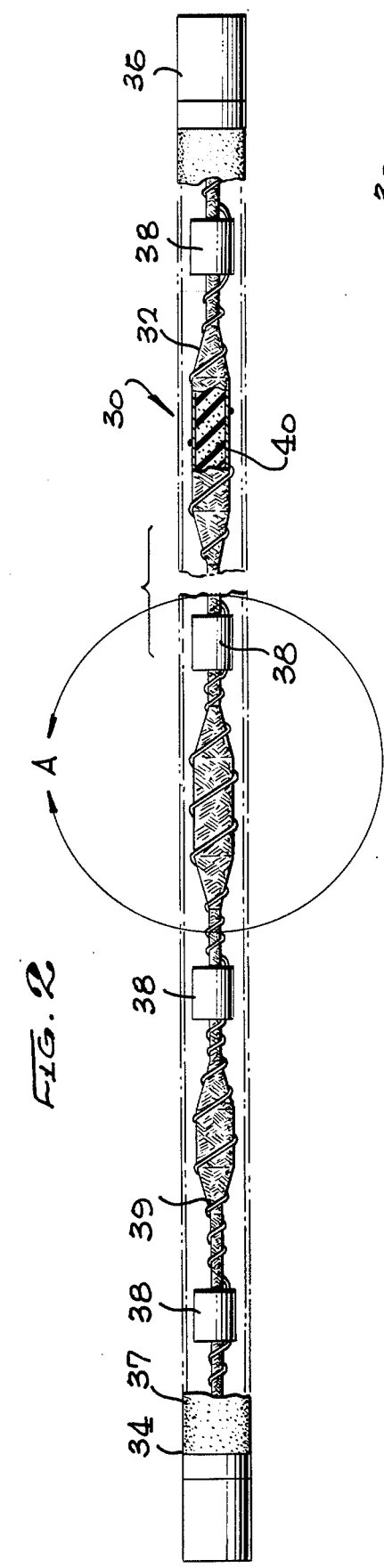
FIG. 2 is a plan view, partly in section, of a vibration isolation module according to my invention.

FIG. 2 shows a VIM made according to my invention. In this view the VIM 30 includes a braided aramid fiber rope 32 which is suitably bonded at each end to hose termination members 34 and 36 which terminate among other things, an oil filled hose 37 as described above. A suitable bonding technique and structure for bonding the aramid fiber to a termination member is taught in U.S. Pat. No. 4,184,784 to Killian. A plurality of polyurethane spacers 38 are bonded to rope 32 at various locations along the rope, each of which provides a groove or channel for supporting an electrical cable 39. At each interval between spacers a polyurethane damping member 40 is inserted and carried between the strands of rope. Some strands are shown cut away to show members 40. Each damping member 40 is, or may be, formed of a length of polyester polyurethane hose cut to a desired length and having its ends formed into a tapered configuration. Some of damping members 40 may be filled solid with polyurethane and the lengths of members 40 and the spacing of spacers 38 may be varied to provide the desired vibration impedance for each section between spacers 38. Each such section may be viewed as a single VIM whose impedance characteristics are variable with the length and stiffness of its damping member so that it tends to absorb vibration in a given frequency band.

Figure 3:
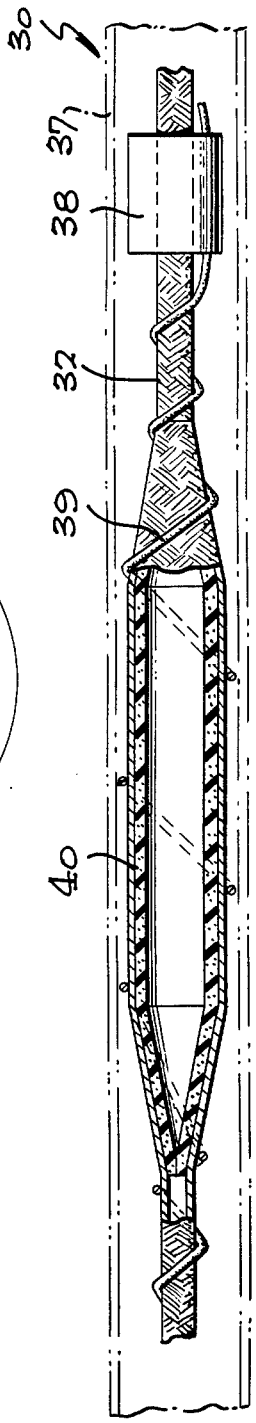
FIG. 3 is an enlarged detailed view of a portion of FIG. 2.

The physical configuration of the sections of VIM 30 may be better understood from consideration of FIG. 3 which is an enlarged view of part A of FIG. 2 shown partly in section. In this view a desired length of polyurethane hose is tapered at each end to form a damping member 40, shown in section. Each of the damping members 40 is inserted between the strands of the braided aramid fiber rope 32 in a section of said rope between spacers 38. As the VIM 30 is subjected to increasing loads, the braided strands of the rope 32 tend to pull closer together tending to squeeze the damping member 40 in a manner somewhat like Chinese fingers. The damping members 40 are securely held between the braided strands and will compress varying amounts with varying amounts of tensile stress on rope 32 depending upon their stiffness, which varies inversely with their length and with whether they are solid or hollow. Oil will flow freely into and out of those damping members which are hollow with changes in the tension on rope 32. The solid filled damping members are, of course, very stiff and tend to damp out high frequencies.

The VIM 30 has substantial advantages over VIM 10 in that it doesn't require a plurality of nylon ropes, all of which must be carefully balanced to assure that they receive substantially equal forces, but only a single braided aramid fiber rope. A single nylon rope, or rope of similar material, will not serve the purpose of the aramid fiber rope because, although it is inherently somewhat resilient, it can easily be loaded to a point of permanent deformation or destruction since the tensile forces in this application are, at times, very high. Insertion of the damping modules into the sections is a comparatively easy operation, and the damping characteristics of the VIM 30 can be easily calculated and/or modified by using modules of varying stiffness. Since the rope 32 should never really bottom out or become taut, the frequency range over which VIM 30 is effective may be made substantially greater than for VIM 10. It will be appreciated that the stiffness of the damping modules may be varied not only with their length but also with variations in wall thickness and diameter. The termination members may actually include a plurality of parts including electrical connectors which are bonded to the structure terminating the aramid fiber rope.

These and other modifications will become apparent to those skilled in the art.

I claim:

1. A vibration isolation module for connection between a towing vessel and an elongated towed sonar array including a stretchable internal strength member for carrying tensile loads, a termination member for connecting the module to the array, wiring for carrying electrical power and signals between the array and the towing vessel and an exterior hose-like jacket bonded to said termination member;

characterized in that the internal strength member comprises a braided strength member of aramid fiber rope fastened to said termination member and a plurality of damping elements carried within the strands of said strength member, said damping elements being formed of polyester polyurethane tubing, each of said damping elements being tapered at each end, a plurality of spacers spaced along the length of said strength member and attached thereto such that said damping elements are carried in said strength member between said spacers.

2. A vibration isolation module as claimed in claim 1 wherein some of said damping elements are filled with polyurethane.

3. A vibration module as claimed in claim 1 wherein said damping elements are of varying stiffness.

4. A vibration module as claimed in claim 1 wherein said damping elements are of varying length.

5. A vibration module as claimed in claim 1 wherein the spacing of said spacers and the lengths of said damping elements are of varying dimensions such that each section between spacers tends to attenuate a specific vibration frequency range.

6. A vibration module as claimed in claim 1 wherein said aramid fiber rope and said jacket are bonded to a termination member at each end of said module.

7. A vibration isolation module for connection between a towing vessel and an elongated towed sonar array including a resilient internal strength member for carrying tensile loads, termination members for connecting said module between the array and the towing vessel, wiring for carrying electrical power and signals between the array and the towing vessel, and an oil-filled exterior hose-like jacket bonded to said termination members;

characterized in that said internal strength member comprises a single braided aramid fiber rope fastened to said termination members, a plurality of damping elements carried within the strands of said strength member, said damping elements being formed of polyurethane tubing tapered at each end, a plurality of molded polyurethane spacers spaced along the length of said strength member and attached thereto such that said damping elements are carried in said strength member between said spacers.

8. A vibration isolation module as claimed in claim 7 wherein some of said damping elements are filled with polyurethane.

9. A vibration module as claimed in claim 7 wherein said damping elements are of varying stiffness.

10. A vibration isolation module as claimed in claim 7 wherein the spacing of said spacers and the lengths of said damping elements are of varying dimensions such that each section between spacers tends to attenuate a specific vibration frequency range.

* * * * *